US009105933B2

(12) United States Patent
Alvarez Gallego et al.

(10) Patent No.: US 9,105,933 B2
(45) Date of Patent: Aug. 11, 2015

(54) GAS DIFFUSION ELECTRODE, METHOD OF PRODUCING SAME, MEMBRANE ELECTRODE ASSEMBLY COMPRISING SAME AND METHOD OF PRODUCING MEMBRANE ELECTRODE ASSEMBLY COMPRISING SAME

(75) Inventors: Yolanda Alvarez Gallego, Antwerpen (BE); Philippe Vermeiren, Wemmel (BE); Andre-Viktor Claes, Mol (BE); Walter Adriansens, Mol (BE)

(73) Assignee: VITO NV, Mol (BE)

( * ) Notice: Subject to any disclaimer, the term of this patent is extended or adjusted under 35 U.S.C. 154(b) by 220 days.

(21) Appl. No.: 13/704,187

(22) PCT Filed: Jun. 29, 2011

(86) PCT No.: PCT/EP2011/060934
§ 371 (c)(1),
(2), (4) Date: Dec. 13, 2012

(87) PCT Pub. No.: WO2012/001061
PCT Pub. Date: Jan. 5, 2012

(65) Prior Publication Data
US 2013/0101906 A1    Apr. 25, 2013

(30) Foreign Application Priority Data

Jun. 29, 2010  (EP) .................................... 10167748

(51) Int. Cl.
*H01M 4/86*  (2006.01)
*H01M 4/88*  (2006.01)
(Continued)

(52) U.S. Cl.
CPC ............. *H01M 4/8605* (2013.01); *H01M 4/62* (2013.01); *H01M 4/8668* (2013.01);
(Continued)

(58) Field of Classification Search
USPC .......................................... 429/535
See application file for complete search history.

(56) References Cited

U.S. PATENT DOCUMENTS 3,553,032 A    1/1971  Hideo et al.
6,602,630 B1 *  8/2003  Gopal ........................... 429/483
(Continued)

FOREIGN PATENT DOCUMENTS

EP    0687023 A1   12/1995
EP    1523053 A2    4/2005
(Continued)

OTHER PUBLICATIONS

European Search Report of EP 10167748.2, Apr. 19, 2011, 13 pages.
(Continued)

*Primary Examiner* — Ula C Ruddock
*Assistant Examiner* — Scott J Chmielecki
(74) *Attorney, Agent, or Firm* — Finnegan, Henderson, Farabow, Garrett & Dunner, LLP

(57) ABSTRACT

A process for producing a gas diffusion electrode comprising the steps of: casting a porous electrically conductive web with a suspension of particles of an electrically conductive material in a solution of a first binder to provide a first layer which is an electrochemically active layer (AL); casting a suspension of particles of a hydrophobic material in a solution of a second binder on said first layer to provide a second layer; and subjecting said first and second layer to phase inversion thereby realizing porosity in both said first layer and said second layer, wherein said subjection of said second layer to phase inversion thereby realizes a water repellent layer; a gas diffusion electrode obtained therewith; the use of a gas diffusion electrode in an membrane electrode assembly; a membrane electrode assembly comprising the gas diffusion electrode; and a method of producing a membrane electrode assembly is realized, said membrane electrode assembly comprising a membrane sandwiched between two electrodes at least one of which is a gas diffusion electrode, wherein said method comprises the step of casting said membrane electrode assembly in a single pass.

16 Claims, 6 Drawing Sheets

(51) Int. Cl.
*H01M 8/10* (2006.01)
*H01M 8/16* (2006.01)
*H01M 4/62* (2006.01)
*H01M 8/02* (2006.01)

(52) U.S. Cl.
CPC ......... *H01M 4/8673* (2013.01); *H01M 4/8807* (2013.01); *H01M 4/8821* (2013.01); *H01M 4/8857* (2013.01); *H01M 8/0239* (2013.01); *H01M 8/1002* (2013.01); *H01M 8/1004* (2013.01); *H01M 8/16* (2013.01); *H01M 4/8892* (2013.01); *H01M 8/0232* (2013.01); *H01M 8/0234* (2013.01); *H01M 2004/8689* (2013.01); *Y02E 60/521* (2013.01); *Y02E 60/527* (2013.01)

(56) References Cited

U.S. PATENT DOCUMENTS

| | | | |
|---|---|---|---|
| 7,301,002 | B1 | 11/2007 | Cornelius et al. |
| 2007/0154778 | A1* | 7/2007 | Haufe et al. ................... 429/42 |
| 2009/0087690 | A1* | 4/2009 | Jose la O' et al. ............... 429/2 |
| 2010/0035125 | A1 | 2/2010 | Greszler et al. |
| 2011/0177234 | A1* | 7/2011 | Chen et al. ..................... 427/58 |
| 2013/0101906 | A1* | 4/2013 | Alvarez Gallego et al. .. 429/401 |

FOREIGN PATENT DOCUMENTS

| | | |
|---|---|---|
| EP | 1724861 A1 | 11/2006 |
| EP | 1930974 A1 | 6/2008 |
| GB | 2316801 A | 3/1998 |
| GB | 2316802 A | 3/1998 |
| WO | WO 03082956 A1 | 10/2003 |
| WO | WO 2008-082694 A2 | 7/2008 |

OTHER PUBLICATIONS

International Search Report of PCT/EP2011/060934, Jun. 29, 2011, 6 pages.
Written Opinion of the International Searching Authority of PCT/EP2011/060934, Oct. 31, 2011, 12 pages.
International Preliminary Report on Patentability of PCT/EP2011/060934, Jun. 28, 2012, 8 pages.
Sung Bum Park et al., Fabrication of GDL microporous layer using PVDF for PEMFCs, International Conference on Advanced Structural and Functional Materials Design 2008, 2009 Journal of Physics: Conference Series 165 012046, 5 pages.

* cited by examiner

GAS DIFFUSION ELECTRODE, METHOD OF PRODUCING SAME, MEMBRANE ELECTRODE ASSEMBLY COMPRISING SAME AND METHOD OF PRODUCING MEMBRANE ELECTRODE ASSEMBLY COMPRISING SAME

This is a U.S. National Phase of PCT/EP/2011/060934, filed Jun. 29, 2011, which claims the benefit of priority to EP 10167748.2, filed Jun. 29, 2010, which is incorporated herein by reference.

TECHNICAL FIELD OF THE INVENTION

The present invention relates to gas diffusion electrodes, a method of producing same, membrane electrode assemblies comprising same and a method of producing membrane electrode assemblies comprising same.

BACKGROUND OF THE INVENTION

U.S. Pat. No. 3,553,032 discloses the method of making a fuel cell electrode comprising a porous bonded matrix of water repellent polymer particles having a thin coating of silver and particles of an electrically conductive material interspersed therein and adhering to said matrix which comprises forming a mixture of a water repellent polymer, particles of an electrically conductive material, and particles of silver carbonate, molding said mixture under pressure to form a coherent structure and heating the resulting coherent structure at a temperature above the decomposition temperature of said silver carbonate but below the softening point of said polymer to thereby form silver and liberate carbon dioxide gas which diffuses through said structure to render it substantially porous. U.S. Pat. No. 3,553,032 fails to teach the use of an alternative binder to cold sinterable fluorinated resins such as polytetrafluoroethylene, fluorinated ethylene-propylene, chlorotrifluoroethylenes, and polyvinylidine fluorides.

GB 2,316,801A discloses an electrocatalytic gas diffusion electrode for fuel cells comprised of: an anisotropic gas diffusion layer that is made of a porous carbon matrix through which carbon particles and poly(vinylidene fluoride) are distributed such that the matrix is homogeneously porous in a direction lateral to gas flow and asymmetrically porous to gases in the direction of gas flow, the porosity of said gas diffusion layer decreasing in the direction of gas flow, said gas diffusion layer having a thickness between about 50 µm and about 300 µm, and a catalytic layer that is made of a coagulated "ink" suspension containing catalytic carbon particles and a thermoplastic polymer, the catalytic layer covering the small pore surface of said gas diffusion layer, said catalytic layer having a thickness between about 7 µm and about 50 µm and a metal catalyst loading between about 0.1 mg/cm² and about 0.5 mg/cm².

EP 1 930 974A1 discloses 1. A method of producing a reversible solid oxide cell, comprising the steps of: tape casting an anode support layer on a support (1); tape casting an anode layer on a support (2); tape casting an electrolyte layer on a support (3); and either laminating said anode layer on top of said anode support layer; removing said support (2) from said anode layer; laminating said electrolyte layer on top of said anode layer; and sintering the multilayer structure; or laminating said anode layer on top of said electrolyte layer; removing said support (2) from said anode layer; laminating said anode support layer on top of said anode layer; and sintering the multilayer structure.

WO 03/082958A1 discloses a membrane electrode assembly, comprising: an anode; a cathode; and a proton exchange membrane positioned between the anode and cathode, wherein at least one of the anode, the cathode, and the proton exchange membrane comprises a sulfonate copolymer having the following chemical structure:

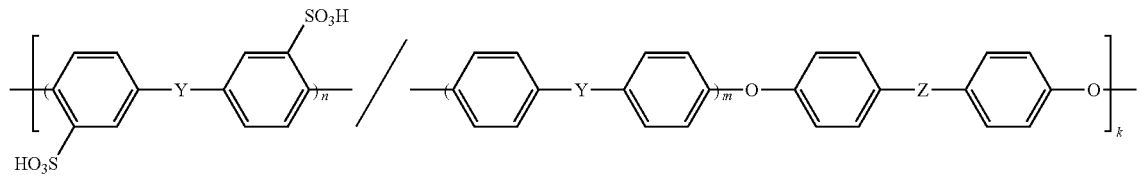

wherein; $n/n+m$ ranges from about 0.001 to about 1; Y may be —S—, S(O), S(O)$_2$, C(O), or P(O) (C$_6$H$_5$), and combination thereof; and Z may be a direct carbon-carbon single bond, C(CH$_3$)2, C(CF$_3$)2, C(CF$_3$)(C$_6$H$_5$), C(O), S(O)$_2$, or P(O) (C$_6$H$_5$).

U.S. Pat. No. 7,301,002B1 discloses a sulfonated polyphenylene polymer, derived by controllably sulfonating a polyphenylene polymer with a sulfonating agent, the sulfonated polyphenylene polymer having repeat units of the following structure 1:

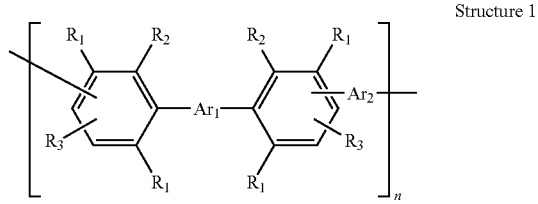

in which R$_1$, R$_2$ and R$_3$ are the same or different, wherein each R$_1$, R$_2$ and R$_3$ is H or an unsubstituted or inertly-substituted aromatic moiety; Ar$_1$ and Ar$_2$ are the same or different, wherein each Ar$_1$ and Ar$_2$ is an unsubstituted aromatic moiety or inertly-substituted aromatic moiety; wherein a pendant side chain of a sulfonyl group attaches to a carbon atom; wherein from one to six sulfonyl groups are attached per repeat unit; wherein n≤0.2; and wherein any combination of R$_1$, R$_2$ and R$_3$ and Ar$_1$ and Ar$_2$ comprises a sub-combination selected from the group consisting of; a) R$_1$ is different than R$_2$, b) R$_1$ is different than R$_3$, c) R$_2$ is different than R$_3$, d) Ar$_1$ is different than Ar$_2$, and e) R$_1$.=R$_2$.=R$_3$=Ar$_1$.=Ar$_2$.

In 2004 M. Cifrain et al. in Journal of Power Sources, volume 127, pages 234-242, reported that Alkaline fuel cells (AFCs), although known to have a high efficiency, were considered to be only useful for space applications due to their high price, their low lifetime and their high carbon dioxide sensitivity and that AFCs can be built low-cost and CO$_2$ reconcilable with sufficient lifetimes for vehicles and backup systems. They reported that key is a liquid circulating electrolyte which avoids many problems that membrane systems have, like the water and the heat management. Furthermore, M. Cifrain et al. reported that a standard AFC-electrode consists of several PTFE-bonded carbon black layers sometimes also containing other hydrophobic materials like paraffin wax or other plastics like polyethylene (PE) or polysulfone (PSU), that other additives are graphite (for increasing the electrical conductivity) and pore-formers (like sugar) and that sometimes porous PTFE foils are pressed onto the gas side, the electrodes being produced by rolling, pressing and sintering procedures.

F. Bidault et al. in 2009 in Journal of Power Sources, volume 187, pages 39-48, reviewed gas diffusion cathodes for alkaline fuel cells and reported that the overall performance and stability is dominated by the behaviour of the cathode, leading to a focus of research effort on cathode development. They further stated that the performance and durability of the gas diffusion electrode is very much dependent upon the way in which the layer structures are fabricated from carbon and polytetrafluoroethylene (PTFE) and that the choice and treatment of the carbon support is of primary importance for the final catalytic activity. They reported that, in general, AFC electrodes consist of several PTFE-bonded carbon black layers, which fulfil different functions, that modern electrodes tend to use high surface area carbon supported catalysts and PTFE to obtain the necessary three phase boundary (TPB) and that pressing, rolling, screen-printing and spraying methods are used in the production of AFC electrodes.

V. Neburchilov et al. in 2010 in Journal of Power Sources, volume 195, pages 1271-1291, reviewed the compositions, designs and methods of fabrication of air cathodes for alkali zinc-air fuel cells and reported that the more promising compositions for air electrodes are based on individual oxides, or mixtures of such, with the spinel, perovskite, or pyrochlore structure; $MnO_2$, Ag, $Co_3O_4$, $La_2O_3$, $LaNiO_3$, $NiCo_2O_4$, $LaMnO_3$, $LaNiO_3$ etc, which provide the optimum balance of ORR activity and chemical stability in an alkali electrolyte. They further reported that sol-gel and reverse micelle methods supply the most uniform distribution of the catalyst on the carbon and the highest catalyst BET surface area and that the design of the air cathode, including types of carbon black, binding agents, current collectors, Teflon membranes, thermal treatment of the gas diffusion layer, and catalyst layers, has a strong effect on performance.

WO 99/45604A discloses a method for preparing an electrode film, said method comprising the steps of: (a) forming an electrode mixture comprising either an anodic material or cathode active material, a polymer and a carrier solvent; and (b) contacting the electrode mixture with a polymer non-solvent to extract at least a portion of the carrier solvent from the electrode mixture to form an electrode film, but no hydrophobic layer is disclosed.

U.S. Pat. No. 6,521,381 discloses method of making an electrode structure comprising the steps of: (a) providing a current collector sheet; (b) forming a mixture comprising proton conductive material and carbon particles; (c) applying the mixture onto the current collector sheet and forming a film from the mixture, the film having first and second surfaces with the first surface adhered to the sheet; and then (d) generating a flux of metal atoms and collecting the atoms on the second surface of the film to form dispersed metallic polycrystals on the second surface of the film, wherein the flux of metal atoms is generated by physical vapor deposition, the physical vapor deposition occurring in a manner which maintains physical characteristics of the metal atoms throughout generation and collection. However, hot press manufacturing techniques are disclosed and there is no mention of phase inversion or the use of coating techniques.

US 2002-0127474A discloses an electrochemical system comprising: an electrochemical cell including: (a) an anode; (b) a cathode, and (c) a selectively proton-conducting membrane disposed between, and being in communication with, said anode and said cathode, said membrane comprising: (a) a hydrophobic matrix polymer and (b) a hydrophilic non-ionic polymer, wherein said hydrophobic polymer and said hydrophilic polymer form together a selectively proton-conducting membrane. US 2002/0127474A1 exemplifies the use of phase inversion techniques to provide an asymmetric membrane that contains pores on one side which are selective to proton passage while at least partially rejecting other cations, anions, and some neutral molecules.

US 2004/0028875A1 discloses a method of making a product with a micro to nano sized structure using a mould having a corresponding structure at a mould surface in which a fluid containing a casting material is brought into contact with said mould surface characterised in that the fluid is subjected to a treatment to induce phase separation therein, in that the said casting material is at least partially solidified on the mould surface and in that the resulting product is released from the mould surface.

US 2009/0228836A1 discloses a process for making an electrode sheet for a lithium electrochemical cells comprising the steps of: a) admixing a polyether polymer or copolymer soluble in water, at least one lithium salt, at least one electrochemically active material, water and an organic solvent miscible with water in a water/organic solvent ratio of a maximum of 50% organic solvent by volume to form a water-based solution/suspension containing by weight at least 20% active electrode material, at least 5% of a polyether polymer or copolymer, and at least 1.5% lithium salt; b) coating the water-based solution/suspension in the form of an electrode thin film onto an electrode support; and c) drying the electrode thin film to obtain an electrode thin sheet having less than 1000 ppm of residual water. Coating is performed on a current collector and phase inversion is realised by drying to remove the solvent.

WO 2006/015482A discloses a process for preparing an ion-permeable web-reinforced separator membrane, comprising the steps of: providing a web (2A) and a suitable paste (5), guiding said web (2A) in a vertical position, equally coating both sides of said web with said paste to produce a paste coated web (2B), and applying a symmetrical surface pore formation step and a symmetrical coagulation step to said paste coated web to produce a web-reinforced separator membrane. WO 2008/015482A discloses the reinforcement of coatings by coating on a polymeric web. Applications in alkaline water electrolysis, Batteries (acid and alkaline). Fuel cells and combinations thereof, were envisaged.

Widespread use of fuel cells is inhibited by the high cost of gas diffusion electrodes with the necessary balance of properties to function efficiently long term in fuel cells, e.g. in alkaline fuel cells, size limitation due to the production techniques used and the inability of conventional manufacturing techniques to be adapted for use in continuous production lines.

There is therefore a need to develop a radically different approach to the manufacture of gas diffusion electrodes for fuel cells while retaining the balance of properties necessary for the efficient long term functioning in fuel cells.

SUMMARY OF THE INVENTION

Prior art gas diffusion electrodes are produced using rolling techniques to provide the required mixture of hydrophobic and hydrophilic pores in an electrically conductive matrix as a result of the dispersion of electrically conductive components such as carbon, graphite and metal particles in the presence of a catalyst necessary to function efficiently long term in fuel cells. In prior art multilayer electrodes poly (tetrafluoroethylene) [PTFE] or perfluorinated ethylene-propylene copolymers [FEP] is used both as a hydrophobic component to provide hydrophobic channels for gas transport and as a binder. Although PTFE is insoluble, it has the ability to creep as a result of a transition temperature near room temperature and hence to be moulded together under cold rolling conditions and hence to bind the multilayer gas diffusion electrodes together. Therefore, the PTFE is present as a cold-sintered continuous structure. Furthermore, the gas diffusion electrodes disclosed in GB 2,316,801A, EP 1 930 974A and WO 02/082958A1 are not suitable for application in galvanic cells, such as a fuel cell or battery, in which the reactants are gaseous and the electrolyte is an aqueous solution, since they lack a water-repellent layer.

It has been surprisingly found that the presence of hydrophobic particles such as PTFE-particles in a membrane produced by the phase inversion of solvent-soluble polymers such as polysulfone provide the hydrophobic channels necessary for multilayer gas diffusion electrodes without electrolyte leakage, without the need for PTFE particles to be cold-sintered together i.e. in which PTFE is not a binder. The production of multilayer gas diffusion electrodes using standard casting techniques followed by phase inversion (i.e. removal of solvent (one or more solvents) by e.g. solvent evaporation or immersion in non-solvent (one or more non-solvents) or mixture of non-solvent (one or more solvents) and solvent) (one or more solvents) represents a fundamental technological breakthrough dispensing with the artisanal techniques previously used, enabling substantial cost reductions, enabling better parameter control and ending the size limitations inherent in the prior art technology. Although phase inversion techniques have been disclosed in the realisation of layers for use in electrodes, such techniques have to the knowledge of the inventors not been applied to the production of gas diffusion electrodes. Furthermore, casting techniques lend themselves particularly well to continuous and automated large scale manufacture with concomitant enormous reduction in cost per $m^2$. Compared with cold-sintered (e.g. cold-rolled or calendered) PTFE gas diffusion electrodes, the dimensions of cast electrodes are virtually unlimited. In addition the reproducibility and homogeneity of cast electrodes are much better than for PTFE electrodes, which are produced in a batch process.

A first object of the present invention is the development of a radically different approach to the manufacture of gas diffusion electrodes for electrochemical cells while retaining the balance of properties necessary for the efficient long term functioning in electrochemical cells.

An advantage of the present invention is that gas diffusion electrodes to be used in a liquid electrolyte are no longer limited by the limitations of prior art technology.

Another advantage of the present invention is a considerable reduction in the production complexity of gas diffusion electrodes and hence reduction in costs.

Another advantage of the present invention is the use of casting techniques which lend themselves to large-scale continuous manufacture.

Another advantage of the present invention is the possibility of disposing of gas diffusion electrodes in an environmentally responsible manner by dissolution with organic solvent without the production of the highly corrosive and toxic hydrogen fluoride, which is produced by incineration in the case of the state of the art electrodes.

Another advantage of the present invention is the possibility of casting membrane electrode assemblies in a single pass.

According to a first aspect of the present invention a process for producing a gas diffusion electrode comprising the steps of: casting a porous electrically conductive web with a suspension of particles of an electrically conductive material in a solution of a first binder to provide a first layer which is an electrochemically active layer [AL]; coating (casting) a suspension of particles of a hydrophobic material in a solution of a second binder on said first layer to provide a second layer; and subjecting said first and second layer to phase inversion thereby realising porosity in both said first layer and said second layer, wherein said subjection of said second layer to phase inversion thereby realises a hydrophobic gas diffusion layer [Water Repellent Layer (WRL)]. Gas diffuses through this WRL to the AL where the gas and the liquid electrolyte interact with each other.

According to a second aspect according to the present invention a gas diffusion electrode is realised obtained by the above-mentioned process for producing a gas diffusion electrode.

According to a third aspect according to the present invention the use of the above-mentioned gas diffusion electrode in a membrane electrode assembly is realised.

According to a fourth aspect according to the present invention a membrane electrode assembly is realised comprising the above-mentioned gas diffusion electrode.

According to a fifth aspect according to the present invention a method of producing a membrane electrode assembly is realised, said membrane electrode assembly comprising a membrane sandwiched between two electrodes at least one of which is a gas diffusion electrode, wherein said method comprises the step of casting said membrane electrode assembly in a single pass, said method preferably comprising at least one phase inversion step.

According to a sixth aspect according to the present invention a membrane electrode assembly is obtained by the above-mentioned method.

According to a seventh aspect according to the present invention a water repellent (hydrophobic gas diffusion) layer is realised, the water repellent (hydrophobic gas diffusion) layer being obtained by a process comprising phase inversion of a layer comprising a second binder and hydrophobic particles.

According to an eighth aspect according to the present invention

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
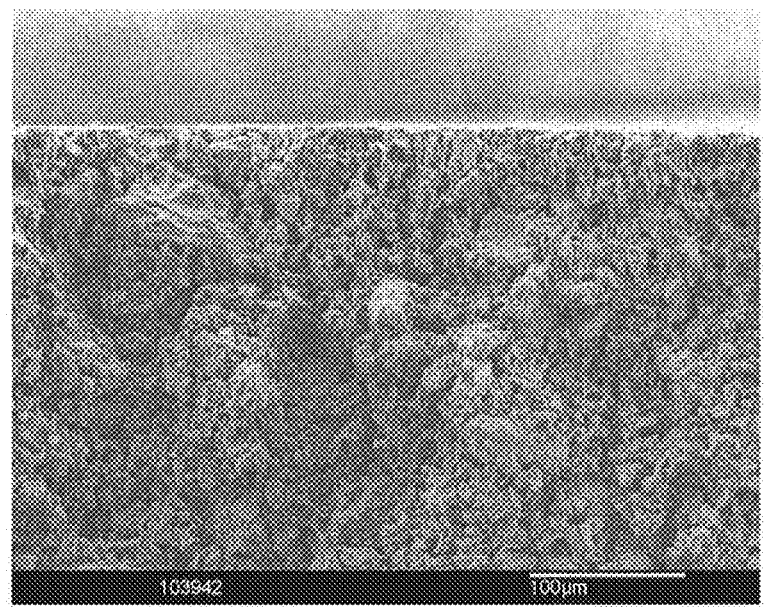
FIG. 1 represents the inner structure of an active layer (AL).
Figure 2:
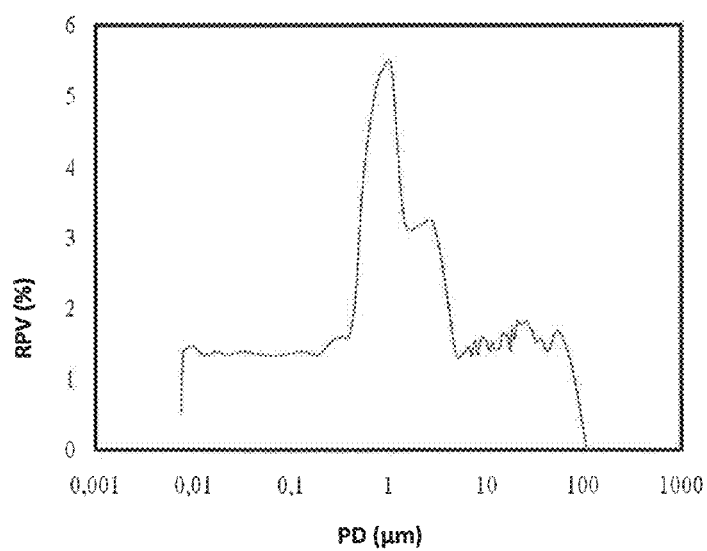
FIG. 2 represents the relative pore volume (RPV) in % as a function of pore diameter (PD) in μm for an active layer (AL).

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The following terms are provided solely to aid in the understanding of the invention,

DEFINITIONS

A gas diffusion electrode, as used in disclosing the present invention, is an electrode enabling a solid, liquid and gaseous interface to be realised, and in which an electrically conducting catalyst supports an electrochemical reaction between the liquid and the gaseous phases and typically comprises a current collector (porous electrically conductive web), an electrochemically active layer (AL) in which the electrochemical reaction takes place having high electrical conductivity and porosity to gas and electrolyte and having an interface with electrolyte on one surface and a water repellant (hydrophobic gas diffusion) layer (WRL) on the other. The Water Repellent Layer (WRL) has an external surface in contact with gas with porosity to the gas and the capability of preventing leakage of electrolyte to the external surface of the gas diffusion layer.

The term "membrane electrode assembly", as used in disclosing the present invention, means a membrane sandwiched between two electrodes and embraces fuel cells, batteries and hybrid configurations thereof.

The term binder, as used in disclosing the present invention, means a resinous or polymeric material which endows the layer in which it is present with mechanical strength i.e. literally binds the layer and excludes a polymer which is simply suspended as particles in the layer.

The term "battery", as used in disclosing the present invention, means an electrochemical device, which allows a reaction to occur at an anode and a cathode, the fuel being contained internally by the battery housing or being air from the atmosphere. Battery as thus defined also embraces metal-air cells in which metals are oxidised to their ions in solution at the anode and air from the atmosphere is reduced to form hydroxyl ions.

The term "fuel cell", as used in disclosing the present invention, means an electrochemical cell that converts a source fuel supplied outside the fuel cell housing into an electrical current, it generates electricity inside a cell through an oxidation reaction at the anode and a reduction reaction at the cathode, the oxidation releasing electrons which travel to the cathode via the external circuit doing electrical work. The circuit is completed by the movement of a compensating charge through the electrolyte e.g. in the form of positive ions. Fuel cells are made up of three segments which are sandwiched together: the anode, the electrolyte and the cathode.

The term "biological fuel cell (biofuel cell)", as used in disclosing the present invention, means a device capable of directly transforming chemical to electrical energy via electrochemical reactions involving biochemical pathways. Biofuel cells use biocatalysts, which include enzymes and non-enzyme proteins e.g. microbes.

Phase inversion is used in membrane preparation involving the phase separation of polymer solutions to produce porous polymeric films. There are three main ways of inducing the demixing required in phase separation: changing the temperature at the interface of the polymer solution, whereby heat is exchanged and demixing induced (so-called temperature induced phase separation or TIPS); subjecting the original solution to a reaction which causes phase separation (so-called reaction induced phase separation or RIPS); and contacting a polymer solution with a vapour or liquid, the resulting diffusional mass exchange inducing a change in the local composition of the polymer film and demixing (so-called diffusion induced phase separation or DIPS). Three types of techniques have been developed to realise DIPS: coagulation by absorption of nonsolvent from a vapor phase, evaporation of solvent and immersion into a nonsolvent bath. Immersion precipitation is achieved by diffusion of nonsolvent from a coagulation bath into the polymer film and diffusion of solvent from the polymer solution into the nonsolvent bath.

The term "particle", as used in disclosing the present application, embraces different shapes and includes fibres, tubes, agglomerates, rounded entities etc.

The abbreviation PTFE, as used in the present application, stands for poly(tetrafluoroethylene), also known as poly(tetrafluorethene).

The abbreviation FEP, as used in disclosing the present application, stands for perfluorinated ethylene-propylene copolymers, also known as perfluorinated ethane-propene copolymers.

The abbreviations PSf and PSU, as used in disclosing the present application, stand for polysulfone.

The invention will now be described by a detailed description of several embodiments of the invention. If is clear that other embodiments of the invention can be configured according to the knowledge of persons skilled in the art without departing from the true spirit or technical teaching of the invention, the invention being limited only by the terms of the appended claims.

If is to be understood that although preferred embodiments, specific constructions and configurations, as well as materials, have been discussed herein for devices according to the present invention, various changes or modifications in form and detail may be made without departing from the scope of this invention. For example, any formulas given above are merely representative of procedures that may be used. Functionality may be added or deleted from the block diagrams and operations may be interchanged among functional blocks. Steps may be added or deleted to methods described within the scope of the present invention.

Process for Producing a Gas Diffusion Electrode

According to a first aspect of the present invention a process for producing a gas diffusion electrode comprising the steps of: casting a porous electrically conductive web with a suspension of particles of an electrically conductive material in a solution of a first binder to provide a first layer which is an electrochemically active layer (AL); coating (casting) a suspension of particles of a hydrophobic material in a solution of a second binder on said first layer to provide a second layer; and subjecting said first and second layer to phase inversion thereby realising porosity in both said first layer and said second layer, wherein said subjection of said second layer to phase inversion thereby realises a water repellent (hydrophobic gas diffusion) layer (WRL).

Considerable foaming may arise upon preparing the suspension of particles of a hydrophobic material in a solution of a second binder due to repulsion of the particles of hydrophobic material e.g. if PTFE-particles are dispersed in a solution of polysulphone in N-ethylpyrrolidinone. In such a case the suspension should be allowed to stand until the foam has subsided before coating the first layer with such a suspension.

According to a preferred embodiment of the first aspect of the present invention, said first layer is subjected to phase inversion thereby realising porosity in said first layer prior to casting said second layer.

According to a further preferred embodiment of the first aspect of the present invention, said first layer and said second layer are subjected simultaneously to phase inversion thereby realising porosity in both said first layer and said second layer.

According to another preferred embodiment of the first aspect of the present invention, phase inversion is realised by immersion in a non-solvent or a solvent/non-solvent mixture. Suitable non-solvents include n-propanol, isopropanol, n-butanol and water.

Suitable electrically conductive particles are electrically conductive particles with a specific surface area in the range of 1 $m^2/g$ to 1500 $m^2/g$ for example metal particles and carbon particles, with highly electrically conductive carbon particles with a specific surface area of at least 100 $m^2/g$ being preferred. Suitable highly electrically conductive carbon particles with high specific surface areas include graphite, carbon nanotubes, carbon black e.g. Norit SX-1G, Vulcan XC-72, Ketjenblack.

According to another preferred embodiment of the first aspect of the present invention said electrically conductive material is carbon or a metal.

According to another preferred embodiment of the first aspect of the present invention the weight ratio of electrically conductive particles to first binder in said suspension of particles of an electrically conductive material in a solution of a first binder is in the range of 80 to 95% by weight, with 70 to 80% by weight being preferred.

Casting techniques in combination with the principle of phase inversion make it possible to control the most important properties of a gas diffusion electrode e.g. thickness, porosity, pore distribution, structure (pore shape), mechanical characteristics, dimensions, in particular the hydrophilic channels to allow the electrolyte to diffuse through to the electrode and hydrophobic channels to allow the gas to diffuse to the electrode and to prevent leakage of electrolyte from the external surface of the gas diffusion electrode and overvoltage. This can be realised by varying the slit width of the slot or die of the casting head, the choice of polymer to bind the electrode together, the quantity and particle size of any pore-formers used, the volume ratio of polymer to electrode material, the weight ratio of polymer to solvent, the type of solvent used, the type of non-solvent used and the temperature at which the extraction i.e. coagulation occurs. However, to be able to cast a gas diffusion electrode the binder has to be soluble and the most soluble polymers have high surface energies (e.g. 41 $mJ/m^2$ for PSf), PTFE, the binder of choice in prior art multilayer electrodes is insoluble, but is able to function as a binder due to its ability to creep as a result of a transition temperature near room temperature and hence to be moulded together under cold rolling conditions which results in cold sintered PTFE which binds the multilayer gas diffusion electrodes together while providing hydrophobic channels for gas transport and preventing the surface leakage of hydrophilic electrolyte.

Surprisingly the inventors have found that the presence of hydrophobic particles, such as PTFE particles in a porous layer produced by the phase inversion of solvent-soluble binders with high surface energies, such as polysulphone, provide hydrophobic channels for gas transport, which also prevent the surface leakage of liquid (hydrophilic) electrolyte, despite the huge difference in surface energy between the hydrophobic particles, e.g. 18 $mJ/m^2$ for PTFE, and solvent-soluble binders, e.g. 41 $mJ/m^2$ for PSf. Moreover, it appears that the necessary hydrophilic and hydrophobic channels can in this case be much more accurately connected with one another whereby the liquid electrolyte and the gas can come together in the electrochemically active layer (AL) in a very efficient manner to realize the electrochemical reaction. Such a combination in the electrochemically active layer (AL) of the gas diffusion electrode results in a high performance gas diffusion electrode with a more optimal three phase contact i.e. a gas-liquid-solid interface, while preventing electrolyte leakage from the surface of the gas diffusion electrode, an ideal combination of properties for gas diffusion electrodes.

A single solvent or a mixture of solvents may be used. A variation in solvent mixture will give rise to different film morphologies and hence in electrode performance. Suitable solvents include N,N-dimethylformamide (DMF), formamide, dimethylsulphoxide (DMSO), N,N-dimethylacetamide (DMAC), acetonitrile, acetamide, trichloroethylene, chloroform, dichloromethane, N-methyl-pyrrolidinone (NMP) and N-ethyl-pyrrolidinone (NEP).

According to another preferred embodiment of the first aspect of the present invention, said water repellent layer is capable of preventing electrolyte leakage.

According to another preferred embodiment of the first aspect of the present invention, said suspension of particles of a hydrophobic material in a solution of said second binder further comprises a hydrophobizing agent.

According to another preferred embodiment of the first aspect of the present invention, said suspension of particles of an electrically conductive material in a solution of a first binder and/or said suspension of particles of a hydrophobic material in a soluble of a second binder contain a pore formation promoting agent.

Suitable pore formation promoting materials include hydrophilic polymers. Suitable hydrophilic polymers include poly(vinyl pyrrolidone) (PVP), crosslinked polyvinylpyrrolidone (PVPP), poly(vinyl alcohol), polyvinyl acetate), methyl cellulose and polyethylene oxide, inorganic powders with a suitable size distribution can also be used and provide improved fine tuning of the pore sizes in the different layers. Powders such as ZnO or $CaCO_3$ can be easily leached out of the final electrode using an acid or alkaline solution.

According to another preferred embodiment of the first aspect of the present invention, said suspension of particles of an electrically conductive material in a solution of a first binder further comprises a catalyst. Suitable cathode catalyst materials include noble metals e.g. platinum and silver, non-noble metals, manganese oxides, perovskites and spinels. Suitable anode catalyst materials include nickel, raney nickel, ceria and materials having a surface composition comprising a composition $M_x/Pt_y/Sub$; wherein M is selected from the group of elements Fe, Co, Rh and Ir; or wherein M represents two different elements selected from the group comprising Fe, Co, Rh, Ir, Ni, Pd, Cu, Ag, Au and Sn; and wherein Sub represents a substrate material selected from Ru and Os; the respective components being present within specific ranges.

Current Collector

Porous Electrically Conductive Web

According to another preferred embodiment of the first aspect of the present invention, the porous electrically conductive web is a carbon electrode e.g. a pitch-bonded carbon electrode or a carbon foam, a metal-cast electrode or a metallic electrode e.g. a punched metal sheet, a woven metallic material, a metallic mesh, a metallic screen, a metal gauze, a metallic foam or an electrically conducting net. Selection of material for the porous electrically conductive web is dependent upon the requirements of the application. Suitable materials include stainless steel and nickel. The pore size in the porous electrically conductive web is preferably in the range of 149 µm to 840 µm.

According to another preferred embodiment of the first aspect of the present invention, the porous electrically conductive web is chemically or thermally treated, e.g. to avoid corrosion in strongly acidic electrolytes.

Hydrophobic Particles

Suitable hydrophobic particles include fluorinated polymers such as PTFE or FEP and minerals such as talc. PTFE particles a few microns in diameter have been found to be particularly useful.

According to another preferred embodiment of the first aspect of the present invention, the weight ratio of hydrophobic particle to second binder in said suspension of particles of a hydrophobic material in a solution of a second binder is in the range of 1.25 to 20, with 2.5 to 6 being preferred.

According to another preferred embodiment of the first aspect of the present invention, the concentration of hydrophobic particles in the second layer is in the range of 5 to 80% by weight, with 50 to 75% by weight being preferred.

According to another preferred embodiment of the first aspect of the present invention, the particle size of the hydrophobic particles is in the range of 0.2 to 470 µm, with 20 to 300 µm being preferred.

According to another preferred embodiment of the first aspect of the present invention, the number averaged particle size of the hydrophobic particles is in the range 50 to 260 µm, with 70 to 180 µm being preferred.

According to another preferred embodiment of the first aspect of the present invention, said hydrophobic material is a fluorinated polymer, with poly(tetrafluroethylene) (PTFE) or perfluorinated ethylene-propylene copolymer (FEP) being preferred or a mineral, such as talc, said mineral being preferably non-conductive.

Binders

Suitable polymers for use as first and second binders include polysulphone (PSU), polyethersulphone (PES), polyphenylenesulfide (PPS), polyvinyl chloride (PVC), chlorinated polyvinyl chloride (C-PVC), polyvinylidene fluoride (PVDF), poly(acrylonitrile) (PAN), polyethyleneoxide (PEO), polymethylmethacrylate or copolymers thereof. PVDF, VDF-copolymers and organic polymer compounds composed primarily of PVDF are particularly preferred from the standpoint of oxidation/reduction-resistance and film-forming properties. Among these, terpolymers of vinylidene fluoride (VDF), hexafluoropropylene (HFP) and chlorotrifluoroethylene (CTFE) are preferred for their excellent swelling property, heat resistance and adhesion to electrodes.

According to a preferred embodiment of the first aspect of the present invention said first and second binder are the same binder.

According to a further preferred embodiment of the first aspect of the present invention at least one of said first and second binder is polysulfone.

Gas Diffusion Electrode

According to a second aspect according to the present invention a gas diffusion electrode is realised obtained by the above-mentioned process for producing a gas diffusion electrode.

Although many of the components used in the gas diffusion electrodes of the present invention are also present in gas diffusion electrodes produced by conventional manufacturing methods, the gas diffusion electrodes of the present invention differ in at least one fundamental respect namely that in the gas diffusion electrodes of the present invention, although Teflon® particles are present in the gas diffusion electrodes of the present invention they are not sintered together by cold flow as is necessary for the mechanical stability of conventional gas diffusion electrodes. This means that the spatial integrity of the multilayer gas diffusion electrode according to the present invention will be lost upon contact with a solvent for the soluble polymer used in the phase invention process, whereas conventional gas diffusion electrodes will retain their spatial integrity.

According to a preferred embodiment of the second aspect of the present invention, said water repellent layer (WRL) is capable of preventing electrolyte leakage.

Membrane Electrode Assembly

For a membrane electrode assembly to operate efficiently contact must be provided simultaneously with the three phases present: gas, liquid (electrolyte) and solid electrode. According to a fourth aspect according to the present invention a membrane electrode assembly is realised comprising the gas diffusion electrode, according to the third aspect.

According to a preferred embodiment of fourth aspect of the present invention said membrane electrode assembly is a fuel cell.

According to a further preferred embodiment of fourth aspect of the present invention said membrane electrode assembly is a battery.

According to another preferred embodiment of the fourth aspect of the present invention said membrane electrode assembly is a biological fuel cell, with a microbial or enzymatic fuel cell being a preferred biological fuel cell.

The fuel cell can be an alkaline fuel cell e.g. a zinc-air alkaline fuel cell or a microbial or enzymatic biofuel cell as described in R. A. Bullen et al. in Biosensors and Bioelectronics, volume 21, pages 2015-2045 (2006) in which biofuel cells and their development are reviewed with much of the work in the previous decade being focused on the development of the chemistries of the electrode-enzyme-substrate interactions, which has resulted in the identification of more robust and active microbes and enzymes, the development of mediators with potentials very close to those of the enzyme active site systems and improved mediator arrangements. A mediator-less microbial fuel cell does not require a mediator but uses electrochemically active bacteria to transfer electrons to the electrode (electrons are carried directly from the bacterial respiratory enzyme to the electrode). Among the electrochemically active bacteria are *Shewanella putrefaciens* and *Aeromonas hydrophila*. Some bacteria, which have pili on their external membrane, are able to transfer their electron production via these pili. Bacteria in mediator-less MFCs typically have electrochemically-active redox enzymes such as cytochromes on their outer membrane that can transfer electrons to external materials.

Use of the Gas Diffusion Electrode

According to a third aspect according to the present invention the use of the above-mentioned gas diffusion electrode in a membrane electrode assembly is realised.

According to a preferred embodiment of the third aspect of the present invention the membrane electrode assembly is a fuel cell.

According to a further preferred embodiment of the third aspect of the present invention said membrane electrode assembly is a battery.

According to another preferred embodiment of the third aspect of the present invention said membrane assembly is a biological fuel cell, the biological fuel cell being preferable a microbial or enzymatic fuel cell.

The gas diffusion electrode, according to the present invention, can be used in fuel cells such as the alkaline hydrogen-air fuel cell; the alkaline zinc-air fuel cell; electrochemical cogeneration cells; biological fuel cells, such as microbial fuel cells; chloralkali cells, batteries and water electrolysis.

In electrochemical cogeneration fuel cell systems specific chemicals are produced in addition to electrical energy via the operation of a fuel cell in which porous gas diffusion electrodes are essential.

In microbial fuel cells waste water is purified and at the porous gas diffusion electrodes particular components are converted, whereby energy is produced at the same time e.g. oxygen from the air is reduced.

The chloralkali industry is considering the use of air-cathodes instead of the present hydrogen cathodes. The use of air-cathodes results in a significant decrease in the cell voltage (reduction in electricity consumption): the theoretical cell voltage should be reduced from 2.19V to 0.96 V. In practice 500 kWh per ton chlorine can be saved.

According to a preferred embodiment of the third aspect of the present invention said membrane electrode assembly is an alkaline fuel cell, with a metal-air alkaline fuel cell, e.g. a zinc-air alkaline fuel cell, being a preferred alkaline fuel cell.

According to a further preferred embodiment of the third aspect of the present invention said membrane electrode assembly is a bioelectrochemical system, with a microbial fuel cell, enzymatic fuel cell and microbial electrolysis cell being preferred bioelectrochemical systems.

A breakthrough in all these systems is in large measure dependent upon the performance of the porous gas diffusion electrode, in the present porous gas diffusion electrodes the following important improvements and optimalisations are necessary: overvoltage, cost price, lifetime and dimensions (certainly in the case of MFC and chloralkali cells).

Method of Producing a Membrane Electrode Assembly

Furthermore, not only is it possible to cast a gas diffusion electrode, but it is also possible to cast a single cell unit (MEA: membrane Electrode Assembly). The anode, cathode and membrane can be cast in a single pass to provide a unit cell. This in addition to being enormously cost saving has the advantage of an improved interface between the electrodes and the membrane. If the separate components (electrodes and membrane) do not have an efficient contact at the interface between two of said components mass transport problems can arise at the interfaces between these different components, in addition to the advantage of optimal quality of the interface between the castings, there is the additional advantage of realising an ideal adhesion between the electrodes and the membrane.

According to a fifth aspect according to the present invention a method of producing a membrane electrode assembly is realised, said membrane electrode assembly comprising a membrane sandwiched between two electrodes at least one of which is a gas diffusion electrode, wherein said method comprises the step of casting said membrane electrode assembly in a single pass.

Water Repellent Layer (WRL)

According to a preferred embodiment of the seventh aspect according to the present invention, a water repellent (hydrophobic gas diffusion) layer of a gas diffusion electrode is realised, the water repellent (hydrophobic gas diffusion) layer of the gas diffusion electrode being obtained by a process comprising phase inversion of a layer comprising a second binder and hydrophobic particles.

According to a preferred embodiment of the seventh aspect according to the present invention, the layer further comprises at least one solvent for said second binder and optionally at least one non-solvent for said second binder.

According to another preferred embodiment of the seventh aspect according to the present invention, said phase inversion is realised by immersion in at least one solvent for the second binder and optionally further comprises at least one solvent for said second binder.

Main Characterization Techniques

See Examples 7, 8 and 9

Thickness

The thickness is measured with a Mitutoyo micrometer. This micrometer is equipped with a slip coupling to avoid the porous electrodes being compressed during the thickness measurement. The thickness is measured at 4 different points so that a reliable average value can be obtained.

Porosity.

it is clear that the porosity of the electrochemically active layer (AL) is of major importance. It is however very important to distinguish between the hydrophobic and the hydrophilic porosity. Hydrophobic pores are indeed required for the absorption of the electrolyte (e.g. wastewater) and the hydrophobic porosity is needed for the transport of air ($O_2$) to the active sites of the carbon.

An AL is immersed in water and from the total amount of water which is absorbed it is possible to calculate the absolute volume of the hydrophilic pores. Compared with the volume of the sample it is then possible to calculate the relative volume of these hydrophilic pores which can be expressed as the hydrophilic porosity ($P_{H2O}$). Isopropanol (IPA) is used to determine the total porosity ($P_{IPA}$), which includes the hydrophobic porosity. This is because the very low surface tension of IPA allows for a complete wetting of the AL, the surface tension of IPA being 22 $mNm^{-1}$ compared to 73 $mNm^{-1}$ for water.

Pore Size Distribution.

For the measurement of the pore size distribution the typical Hg intrusion porosimetry is used (Instrument type: Pascal 240). A sample is immersed in a cell which is then filled with mercury. With a continuously increasing pressure, an increasing volume of mercury is forced within the pores of the sample.

Pore diameters have also been determined with a gas permeation technique (capillary flow porosimetry). First a gas flow is measured through a dry electrode as a function of pressure, with a straight line being generally obtained. Then the electrode is wetted and again the gas flow is determined as a function of the applied pressure. At very low pressures the pores are still filled with the wetting liquid but at a certain pressure the largest pores will be emptied and the gas flow will increase by convective flow through these pores. Here it is only the open pores, going from one side of the layer to the other which are being measured.

Water Absorption Kinetics.

In the selection process of the AL layers it is also important to quantify the water absorption kinetics. The amount of water absorbed by capillarity can be expressed by the following equation:

$$Q=At^{1/2}$$

where Q is the amount of absorbed water per surface unit (mg cm$^{-2}$), A is the absorption coefficient (mg cm$^{-2}$ s$^{1/2}$) and t is the time (s).

Electric Resistance.

The electric resistance was measured in a self-made cell equipped with two smooth Pt/Pd electrodes which can be fixed to or away from each other with help of a screw. The cell has been designed for samples up to 24 mm in diameter. A single cast electrochemically active layer (AL) is placed between the two electrodes which are then screwed to each other to contact the active layer (AL). At that moment the resistance between the Pt/Pd electrodes is measured. However the measured value is composed of the AL resistance together with the two contact resistances occurring between the AL surfaces and the Pt/Pd electrodes. To solve this problem a series of measurements is required. For the first experiment one AL is placed between the Pt/Pd electrodes, for a second experiment two ALs are put on each other and placed between the Pt/Pd electrodes and this is repeated till at least four samples are measured together. The total AL resistance values are then plotted against their respective total thickness. A straight line is thus obtained, the slope of which is the resistance expressed as Ω/mm. The sum of the contact resistances is determined by the intercept of the straight line with the resistance axis.

Specific Surface Area.

The specific surface area of the AL ($S_{BET}$) is a measure for the amount of free active C sites inside the porous structure of the electrode and the higher the amount of these sites the higher the reactivity of the electrode will be. The specific surface area has been measured with the well known N2 adsorption technique.

EXAMPLES

Example 1

Example 1 describes the preparation of a gas diffusion electrode (10/V021) prepared according to the process of the present invention and evaluation thereof in a microbial fuel cell. The oxygen/air diffusion electrode in this cell contained no catalyst, because microbial fuel cells are intended not only to produce electricity but also to purify waste water, it is clear that in such an environment a catalyst would become very rapidly poisoned by the impurities present in the waste water and thereby rapidly lose its activity. Furthermore this electrode was tested in a very poorly conducting medium, at pH=7.

The preparation of the gas diffusion electrode 10/V021 comprised the steps of putting a stainless steel net in a frame under tension, preparing a suspension for the electrochemically active layer (AL), casting the electrochemically active layer (AL) of the gas diffusion electrode, aftertreatment of the electrochemically active layer (AL), preparation of a suspension for the Water Repellent Layer (WRL), casting the WRL on the electrochemically active layer (AL) and aftertreating the WRL to realise a gas diffusion electrode.

Putting the Stainless Steel Net in the Frame Under Tension

The stainless steel net was clamped on a metallic (stainless steel) frame and with the help of a moment-key brought to the correct tension. As follows: the net was first cut out, then provided with the necessary holes in the net and clamped on a frame with bolts and clamp-bars. The bolts were then tightened with a torque wrench and the tension determined. The net was then left overnight to set and the tension checked again and if necessary adjusted, Preparation of Suspension C12/70-30 for the Electrochemically Active Layer (AL)

The suspension was prepared with the help of a mixer (Dissmax) in a disposable can. A new can was selected, cleaned with a little ethanol and rubbed dry. The can was placed on the balance and the tara set at 0. Then 352 g of N-ethylpyrrolidinone (NEP) was weighed into the can and then place on a stirrer platform where it was clamped and the stirrer lowered into the liquid and the stirrer set at ca. 1000 rpm. 48 g of polysulfone (UDEL P-1800 NT 11) was weighed into a glass beaker and then it was slowly added with a funnel to the NEP and the stirrer speed increased to ca. 2000 rpm so that a vortex is clearly visible in the can. The eccentric turning of the can was then started and the mixture stirred for a further 60 minutes. 112 g Activated carbon (Norit SX-1G) was then weighed out and slowly added with a funnel and the stirrer speed increased to ca. 2400 rpm ensuring that there is a large vortex. After mixing for a further 15 minutes the mixing was stopped, the stirrer withdrawn and any powder on scraped off the upper walls of the mixing can and the upper part of the stirrer rod and blades with a spatula so that the powder falls into the mixing can. The stirrer was then lowered into the mixing can and stirring with eccentric movement at ca. 2400 rpm resumed. After 45 minutes further mixing a lid was placed on the can and the contents further mixed on a roller table for at least one night.

Casting of an Electrochemically Active Layer (AL):

The suspension was taken off the roller table and statically deaerated at room temperature at a pressure of 50 mbar (in a Heraeus vacuum oven) for 2 hours after which the vacuum oven pressure was slowly raised to atmospheric pressure. The suspension was then ready for casting. The dipping bath was first filled with demineralised water and the casting head set at 300 µm. A glass plate and the tension frame was then mounted on the dipping bracket and adjusted so that the glass plate was 200 µm lower than the underside of the stainless steel net. After degreasing the glass plate and stainless steel net with alcohol and using gloves replace the glass plate and stainless steel net on the dipping bracket. The whole configuration was then placed on the casting table (Auto Film Appl. BRAIVE), the casting head put onto the stainless steel net and the casting table set on stand 3 (0.92 m/min). The casting head was then filled with the suspension and the longitudinal motion of the casting table started. When the casting head has reached the end the whole configuration was slowly and with constant movement dipped in the water bath. After 20 minutes dipping, the whole configuration was removed from the water bath and then further treated as described below.

Aftertreatment of the Electrochemically Active Layer (AL):

The whole configuration was then immersed in demineralised water at 100° C. for 60 minutes to remove the residual NEP as follows: the boiling-out bath was filled with 36 L of demineralised water and the whole configuration immersed in the boiling bath. The boiling out bath was then closed and the heated switched on and set at stand 6. Having reached boiling point, the setting was reduced to stand 5. After at least 80 minutes at stand 5, the heating was switched off and the lid removed so that the bath could cool down. After cooling for 80 minutes, the whole configuration was removed from the bath still in a spanned state and allowed to dry overnight at room temperature.

Preparation of Suspension F15/75-25 for the Water Repellent Layer (WRL):

The suspension was prepared with the help of a mixer (Dissmax) in a disposable can. A new can was selected, cleaned with a little ethanol and rubbed dry. The can was placed on the balance and the tara set at 0. Then 340 g of N-ethyl-pyrrolidinone (NEP) was weighed into the can and then place on a stirrer platform where it was clamped and the stirrer lowered into the liquid and the stirrer set at ca. 900 rpm. 80 g of polysulfone (UDEL P-1800 NT 11) was weighed into a glass beaker and then it was slowly added with a funnel to the NEP and the stirrer speed increased to ca. 1900 rpm so that a vortex is clearly visible in the can. The eccentric turning of the can was then started and the mixture stirred for a further 60 minutes. 180 g FEP (Tetrachim 5328000) was then weighed out and slowly added with a funnel and the stirrer speed increased to ca. 2300 rpm ensuring that there is a large vortex. After mixing for a further 15 minutes the mixing was stopped, the stirrer withdrawn and any powder on scraped off the upper walls of the mixing can and the upper part of the stirrer rod and blades with a spatula so that the powder falls into the mixing can. The stirrer was then lowered into the mixing can and stirring with eccentric movement at ca. 2300 rpm resumed. After 45 minutes further mixing a lid was placed on the can and the contents further mixed on a roller table for at least one night.

Casting of the Water Repellent Layer (WRL), the Outermost Hydrophobic Layer of the Gas Diffusion Electrode:

The suspension was taken off the roller table and deaerated at room temperature at a pressure of 50 mbar (in a Heraeus vacuum oven) for 30 minutes after which the vacuum oven pressure was slowly raised to atmospheric pressure. The suspension was then statically deaerated at 40° C. over 2 days and the suspension was lightly stirred with a spatula. The suspension was then statically deaerated at room temperature for 2 hours for cooling purposes and to remove the last air bubbles. The suspension was then ready for casting. The dipping bath was first filled with demineralised water and the casting head set at 550 µm. The whole configuration was then placed again on the casting table (Auto Film Appl. BRAIVE) and any dust on the toplayer of the electrode blown off with compressed air. The casting head was then put onto the toplayer of the electrode and the casting table set on stand 3 (0.92 m/min). The casting head was then filled with the suspension and the longitudinal motion of the casting table started. When the casting head has reached the end the whole configuration was slowly and with constant movement dipped in the water bath. After 20 minutes dipping, the whole configuration was removed from the water bath and then further treated as described below, Aftertreatment of the Water Repellent Layer (WRL):

The whole configuration was then immersed in demineralised water at 100° C. for 60 minutes to remove the residual NEP as follows: the boiling-out bath was filled with 36 L of demineralised water and the whole configuration immersed in the boiling bath. The boiling out bath was then closed and the heater switched on and set at stand 6. Having reached boiling point, the setting was reduced to stand 5. After at least 60 minutes at stand 5, the heating was switched off and the lid removed so that the bath could cool down. After cooling for 80 minutes, the whole configuration was removed from the bath still in a spanned state and allowed to dry overnight at room temperature. The gas diffusion electrode was then ready for evaluation.

Figure 10:
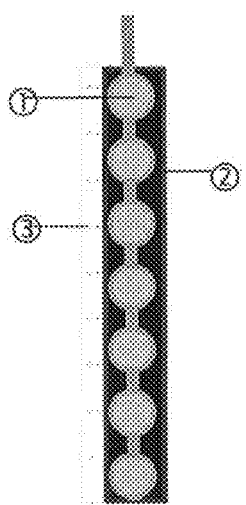
FIG. 10 is a schematic representation of the multilayered gas diffusion electrode according to the present invention, where (1) is a stainless steel mesh (current collector), (2) is an active layer (AL); and (3) is a water repellent layer (WRL).

Thickness Measurement and Cutting:

The tension was slowly reduced so that the whole gas diffusion electrode (net+AL+WRL) could shrink slowly. This took ca, 4 hours. The thickness was then measured and the gas diffusion electrode cut to size. FIG. 10 shows a schematic representation of the resulting multilayer gas diffusion electrode.

Test 10/V021

The electrode was composed of a stainless steel mesh, an AL containing 70% C+30% PSf and a WRL composed of 75% FEP+25% PSf.

Figure 11:
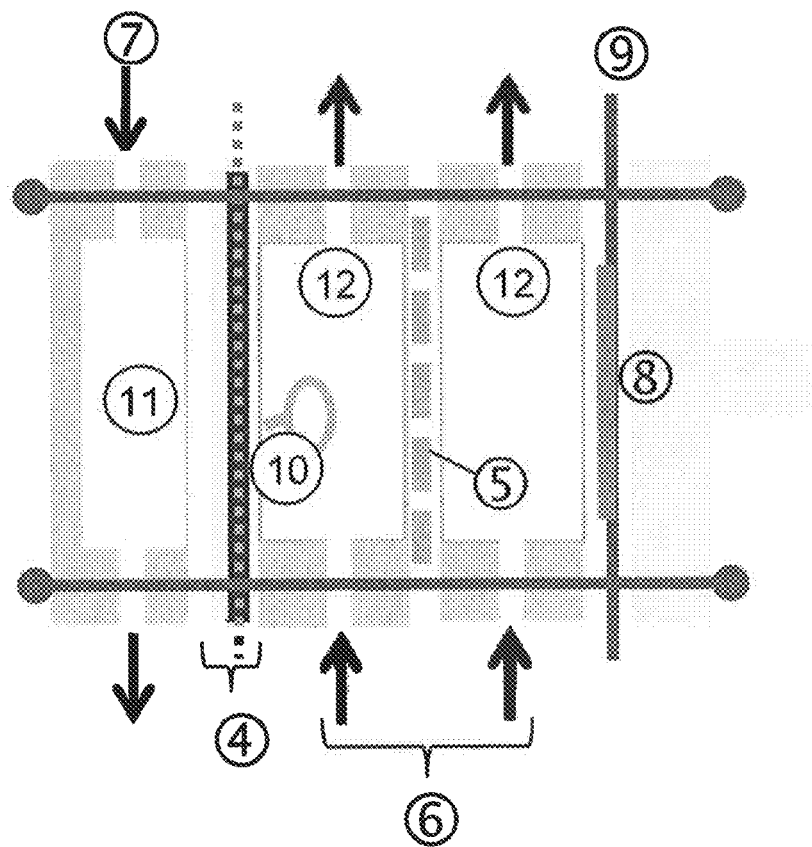
FIG. 11 is a schematic representation (side view) of the cathode half cell used for the characterisation of the electrodes, where (4) is a gas diffusion electrode, (5) is an ion permeable membrane; (8) is an electrolyte (MFC medium) recirculation, 20 mL/min; (7) is an air feed, 5 mbarg overpressure; (8) is a Pt disc on (9) a titanium plate (counter electrode); (10) is the probe reference electrode Ag/AgCl, 3M KCl; (11) is a gas chamber (PVDF housing); and (12) is an electrolyte chamber (PVDF housing).

Operational tests were carried out with the cathodic half-cell as shown in FIG. 11, such as flow rate of the pump, flow direction for the phosphate buffer solution (PBS) and air.

Microbial Fuel Cell (MFC) Medium:

| Ingredient | Concentration |
| --- | --- |
| $NH_4Cl$ | 3.7 mM |
| NaCl | 6.8 mM |
| $MgCl_2 \cdot 6H_2O$ | 1 mM |
| $KH_2PO_4$ | 3.7 mM |
| Yeast extract | 10 mg/L |

The pH of the MFC medium was adjusted to pH 7 by adding 5M sodium hydroxide. The cell was sterilized in an Autoclave before use, then spooled with nitrogen before the test was started and a further curve determined with the buffer. 10 mM acetate was then added and a second curve determined (buffer+acetate). Finally the inoculum was added and a curve of the standard conditions determined (buffer+acetate+bacteria).

The microbial culture used in the experiment was a mixed consortium of three natural mixed culture inocula namely windrow yard waste compost thermophilic anaerobic compost of source separated kitchen waste plus not recyclable waste paper (IGEAN, Brecht, Belgium) and activated sludge from a sewage treatment plant (Aquafin, Dessel, Belgium), plus a pure culture of *Geobacter sulfurreducens* strain (No. 12127) procured from the DSMZ culture collection which was added to the inoculum mix, but the choice of bacteria was not critical to the functioning of the cathode.

Figure 5:
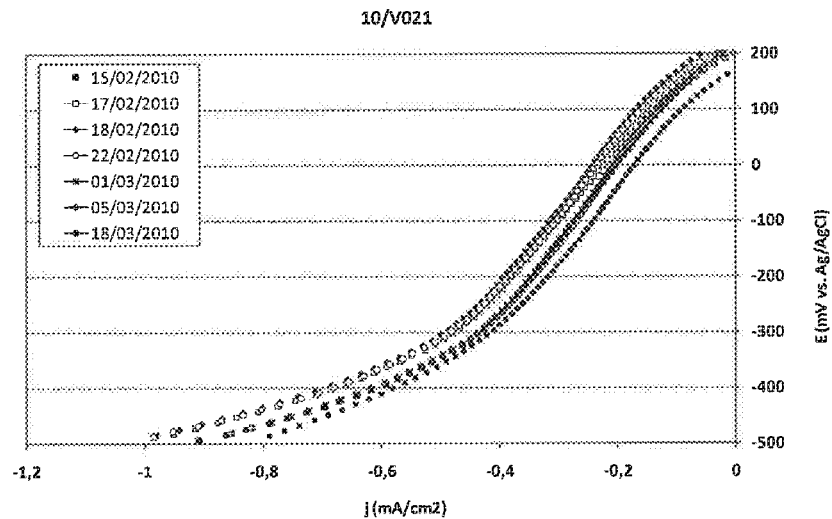
FIG. 5 represents polarisation characteristics for the oxygen reduction reaction in a cathode half cell under the operational conditions of a microbial fuel cell with the gas diffusion electrode 10/V021 with a WRL composed of 75 wt % FEP/25 wt % polysulfone and an electrolyte composed of PBS+acetate+bacteria

The electrode was used and tested as an oxygen reduction electrode in a cathode half-cell configuration. For measurement of an E-j polarization curve the electrode potential varied with a speed of 1 mV per second. At a potential of −100 mV vs. the Ag/AgCl reference electrode a current density of 0.3 mA per $cm^2$ was measured at room temperature. This is a relatively high current density in view of the electrode being in a poorly conducting electrolyte and one, moreover, in which there is no platinum group metal (PGM) catalyst. The E-j polarization curve as a function of time is shown in FIG. 5.

For electrochemical cells/applications in which a catalyst is used and hence the electrolyte is strongly conducting, much higher current densities are to be expected for a particular potential/overvoltage.

The performance was quite stable and neither electrode leakage nor weeping through the electrode was observed over the whole test period.

Example 2

Experiments were performed to determine the electrolyte permeability of Water Repellent Layers (WRL) as a function of layer composition by adding powders of three types of hydrophobic materials in different quantities to a 15% by weight solution of polysulfone in N-ethyl-pyrrolidinone: FEP 800 (from DuPont), PTFE Algoflon (from Solvay Solexis Span) and PTFE 638N (from DuPont) with weight averaged diameters of 96, 95 and 157 μm respectively. The freestanding PSf-based sheets with a thickness of ca. 100 μm (between 91 and 118 μm) were prepared by casting on a glass plate as a temporary support, subjecting the casting to phase inversion by immersing the layers in water and removing the layers from the temporary support.

The porosity of the WRL's numbers 1 to 9 was determined from the amount of liquid taken up by the free-standing WRL's upon immersion in both water and isopropanol, the value obtained with isopropanol being a measure of the total porosity of the gas diffusion layers. The results are given in Table 1. The percentage wetting is a measure of the absorption of water, which should be as low as possible to avoid the electrode from leaking as a function of time.

The wetting of a WRL was defined as the amount of water absorbed by the WRL when it is completely immersed in water. Table 1 shows that the degree of wetting decreased with increasing concentration of hydrophobic polymer. The lower the wetting value the lower the leakage or amount of weeping of electrolyte that can be expected as a function of time. The total porosity of the HGDL's was substantially independent of the concentration of hydrophobic polymer at a level of ca, 70±ca. 10 volume % of the layer.

TABLE 1

| WRL nr | Additional polymer Type | [wt %] | Wetting [%] |
|---|---|---|---|
| 1 | FEP 8000 | 0 | 32 |
| 2 | FEP 8000 | 10 | 28 |
| 3 | FEP 8000 | 20 | 27 |
| 4 | FEP 8000 | 40 | 15 |
| 5 | FEP 8000 | 60 | 7 |
| 6 | FEP 8000 | 70 | 4 |
| 7 | FEP 8000 | 80 | 3 |
| 8 | PTFE 636N | 10 | 24 |
| 9 | PTFE Algoflon | 10 | 21 |

The Water Repellent Layer WRL nr 1, without any additional hydrophobic polymer, exhibited the largest water wetting capacity. The addition of each type of hydrophobic powder even at very low loadings (10 wt %) reduced the wetting of the WRL. It is clear from Table 1 that the most efficient WRL's to prevent electrolyte leakage in long term industrial applications should contain as high concentration as possible of hydrophobic particles such as FEP and PTFE particles.

The maximum load values given in Table 2 are only indicative because they are related to the requested quality of the HGDL. Both the viscosity and the particle size are relevant parameters also related to the requested quality.

TABLE 2

| Type of hydrophobic particle | Maximum loading of hydrophobic particle [%] |
|---|---|
| FEP 8000 | 80 |
| PTFE Algoflon | 70 |
| PTFE 636N | 50 |

Example 3

Figure 6:
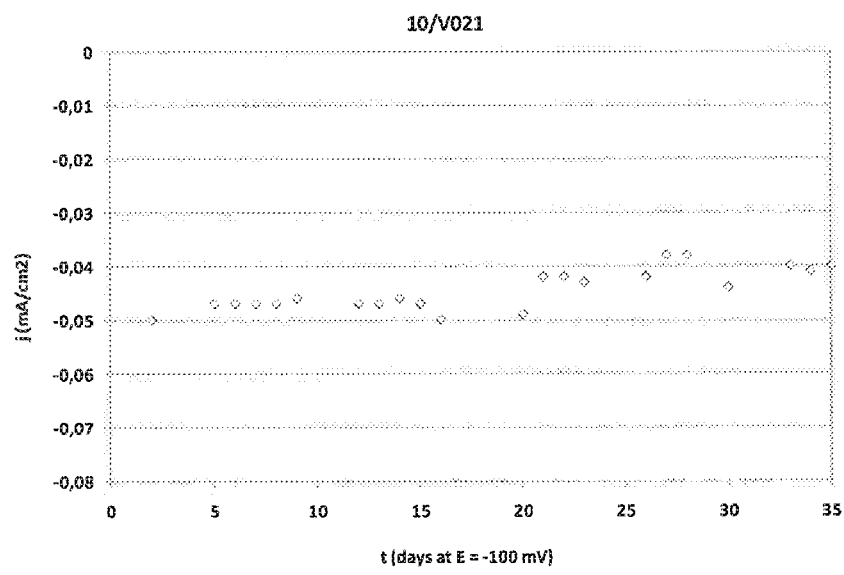
FIG. 6 represents the current density produced as a function of time in a cathode half cell after a voltage of −100 mV has been imposed for the gas diffusion electrode 10/V021 with a WRL composed of 75 wt % FEP/25 wt % polysulfone and an electrolyte composed of PBS+acetate+bacteria.
Figure 7:
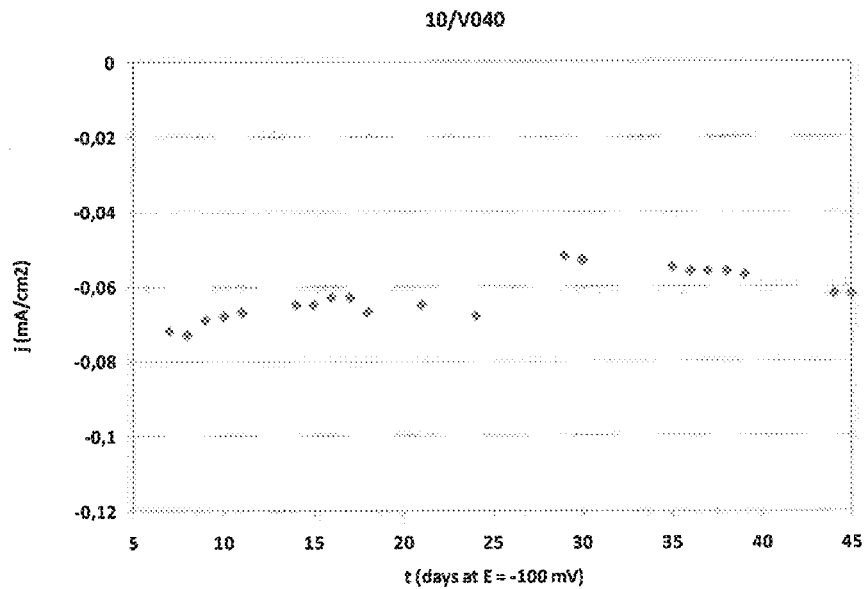
FIG. 7 represents the current density produced as a function of time in a cathode half cell for gas diffusion electrode 10/V040 after a voltage of −100 mV has been imposed with a WRL composed of 75 wt % FEP/25 wt % polysulfone and an electrolyte composed of PBS+acetate

The gas diffusion electrode of Example 1 was tested as a function of time by applying a potential of −100 mV externally by means of a potentiostat. The above-mentioned microbial fuel cell medium was used as electrolyte, including the bacteria used in Example 1, for a period of 35 days. The current density produced was measured as a function of time and is shown in FIG. 6.

The performance was quite stable and neither leakage nor even weeping was observed over the whole test period.

Example 4

Figure 3:
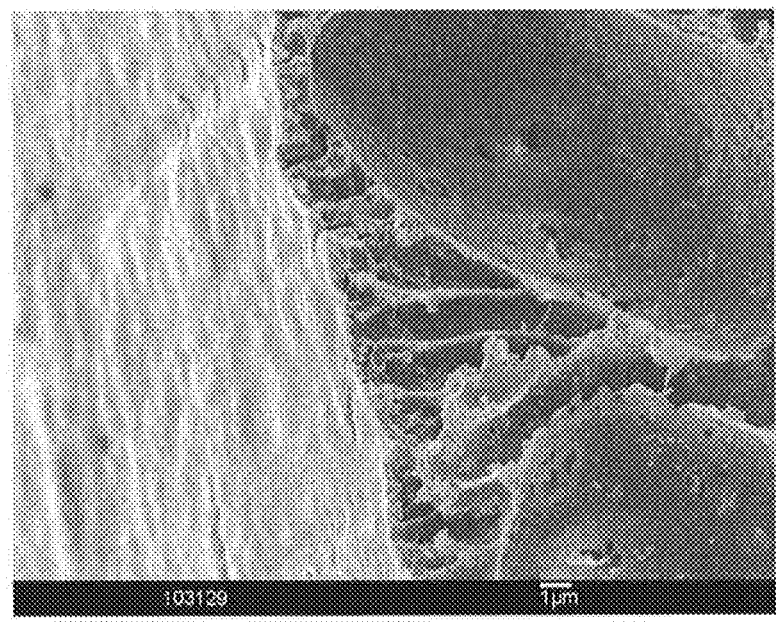
FIG. 3 is a scanning electron micrograph showing the inner structure of a Water Repellent Layer (WRL).
Figure 4:
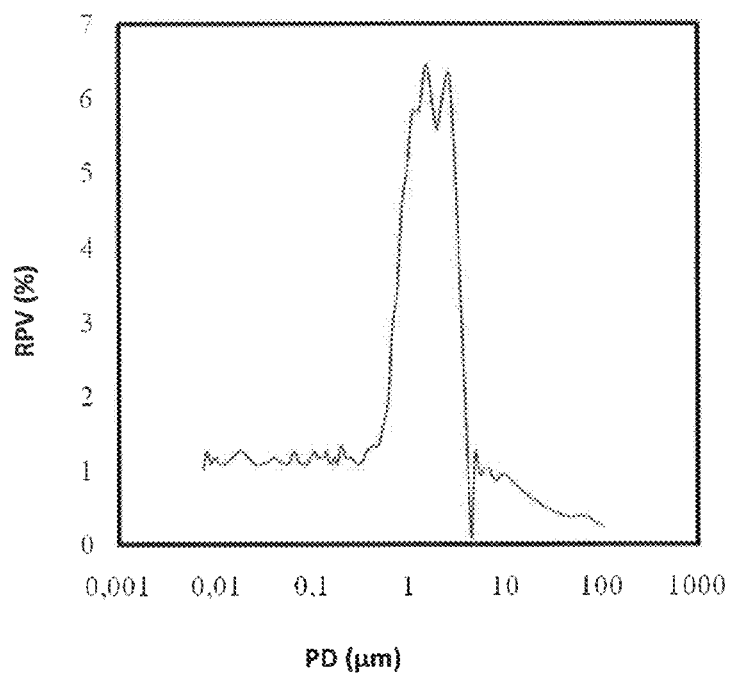
FIG. 4 represents the relative pore volume (RPV) in % as a function of pore diameter (PD) in μm for a Water Repellent Layer (WRL).

The gas diffusion electrode 10/V040 fabricated as described for Example 1 was tested by applying a potential of −100 mV externally by means of a potentiostat to the cathode half cell with the above-mentioned microbial fuel cell medium without the bacteria as electrolyte for a period of 35 days The current density produced was measured as a function of time for a period of 45 days and is shown in FIG. 3. The performance was less stable than in the presence of the bacteria. Neither leakage nor even weeping was observed over the whole test period.

Example 5

Figure 8:
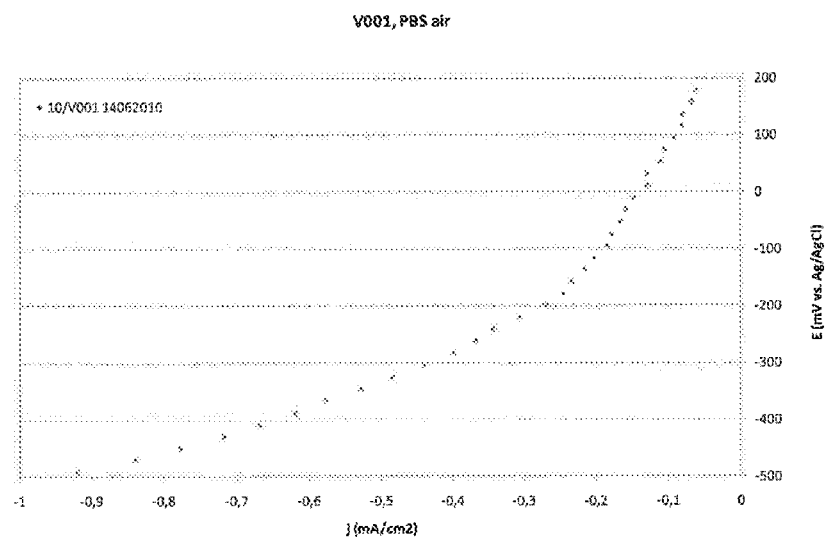
FIG. 8 represents the polarisation characteristics for oxygen reduction reaction in a cathode half cell for the gas diffusion electrode 10/V001 with a WRL composed of pure polysulfone (i.e. without hydrophobic particles) and an electrolyte composed of PBS.

A 10×10 cm$^2$ gas diffusion electrode 10/V001 was fabricated as described in example 1 except that the WRL did not contain hydrophobic particles i.e. was 100 wt % polysulfone. This gas diffusion electrode was tested with the above-mentioned microbial fuel cell medium without addition of acetate or bacteria to the electrolyte. The E-j polarization curve is shown in FIG. 8.

Weeping of electrolyte through the gas diffusion electrode was observed as 2 to 3 ca. 2-3 mm diameter droplets per square cm of gas diffusion layer surface. The electrode was weeping.

Example 6

Figure 9:
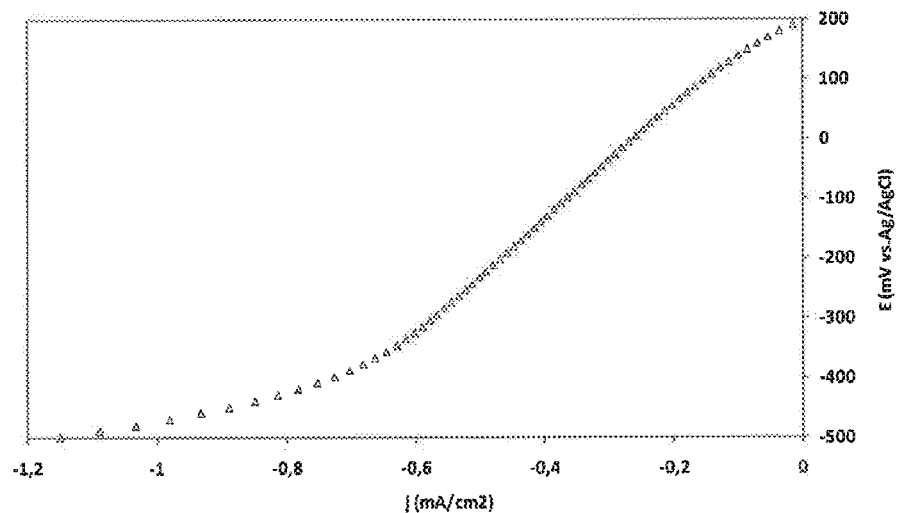
FIG. 9 represents the polarisation characteristics in a cathode half cell for gas diffusion electrode 09/V093 without a WRL and with an electrolyte composed of PBS+acetate+bacteria.

An 10×10 cm$^2$ gas diffusion electrode 09/V093 was fabricated as described in example 1 except that no WRL was cast on the active layer. This gas diffusion electrode was tested with the above-mentioned microbial fuel cell medium as electrolyte to which acetate and the same bacteria as for Example 1 were added. The E-j polarization curve is shown in FIG. 9.

This gas diffusion electrode leaked electrolyte continuously, with ca. 100 mL of electrolyte leaking through the electrode over a 24 hour period.

Table 3 summarises the incidence of weeping and seepage of electrolyte observed with different gas diffusion electrode configurations.

TABLE 3

| gas diffusion electrode | Water Repellent Layer | Leakage of electrolyte |
|---|---|---|
| Example 1 | 75 wt % FEP/25 wt % polysulfone | none |
| Example 5 (comparative) | 100 wt % polysulfone | weeping |
| Example 6 (comparative) | none | continuous if slow leakage |

Example 7

Experiments were performed to determine the effect of the type of non-solvent on the properties of the active layer (AL) with the results shown in Table 4 below.

TABLE 4

| Non-solvent | thickness mm | resistance Ω/mm | A [mg cm$^{-2}$ s$^{-1/2}$] | $P_{H2O}$ [%] | $P_{IPA}$ [%] | $S_{BET}$ [m$^2$g$^{-1}$] |
|---|---|---|---|---|---|---|
| NMP/H$_2$O | 0.70 | 2.2 | 0.34 | 9 | 73 | 172 |
| H$_2$O | 0.76 | 3.2 | 0.27 | 8 | 74 | 207 |

Example 8

Experiments were performed to determine the effect of the amount of C on the properties of the active layer AL with the results shown in Table 5 below.

TABLE 5

| Amount of C [weight %] | thickness [mm] | resistance [Ω/mm] | A [mg cm$^{-2}$ s$^{-1/2}$] | $P_{H2O}$ [%] | $P_{IPA}$ [%] | $S_{BET}$ [m$^2$g$^{-1}$] |
|---|---|---|---|---|---|---|
| 65 | 0.71 | 14.5 | 0.42 | 8 | 73 | 177 |
| 70 | 0.76 | 3.2 | 0.27 | 8 | 74 | 207 |
| 75 | 0.67 | 1.9 | 0.33 | 10 | 70 | 201 |

Example 9

Experiments were performed to determine the effect of the type of polymer on the properties of the active layer (AL) with the results shown in Table 6 below.

TABLE 6

| Polymer type | AL thickness [mm] | AL resistance [Ω/mm] | AL $P_{H2O}$ [%] | AL $P_{IPA}$ [%] | Surface area [m$^2$g$^{-1}$] | Pore diameter [μm] |
|---|---|---|---|---|---|---|
| PSf | 359 | 7.8 | 12 | 73 | 266 | 1.1 |
| PVDF | 334 | 2.5 | 16 | 70 | 400 | 0.7 |

Particular and preferred aspects of the invention are set out in the accompanying independent and dependent claims. Features from the dependent claims may be combined with features of the independent claims and with features of other dependent claims as appropriate and not merely as explicitly set out in the claims.

The invention claimed is:

1. A process for producing a gas diffusion electrode comprising the steps of:
   casting a porous electrically conductive web with a suspension of particles of an electrically conductive material in a solution of a first binder to provide a first layer which is an electrochemically active layer;
   casting a suspension of particles of a hydrophobic material in a solution of a second binder on said first layer to provide a second layer; and
   subjecting said first and second layer to phase inversion thereby realizing porosity in both said first layer and said second layer,
   wherein said subjecting of said second layer to phase inversion thereby realizes a water repellent layer, wherein said hydrophobic material is a fluorinated polymer or an electrically non-conductive material.

2. The process according to claim 1, wherein said first layer is subjected to phase inversion thereby realising porosity in said first layer prior to casting said second layer.

3. The process according to claim 1, wherein at least one of said first and second binder is polysulfone.

4. The process according to claim 1, wherein said fluorinated polymer is poly(tetrafluroethylene) (PTFE) or perfluorinated ethylenepropylene copolymer (FEP).

5. A gas diffusion electrode obtained by a process for producing a gas diffusion electrode according to claim 1.

6. The gas diffusion electrode according to claim 5, wherein the gas diffusion electrode is used in a membrane electrode assembly.

7. The gas diffusion electrode according to claim 6, wherein said membrane electrode assembly is a fuel cell or a battery.

8. The gas diffusion electrode according to claim 7, wherein said fuel cell is a biological fuel cell.

9. The gas diffusion electrode according to claim 8, wherein said biological fuel cell is a microbial or enzymatic fuel cell.

10. A membrane electrode assembly comprising the gas diffusion electrode according to claim 5.

11. The membrane electrode assembly according to claim 10, wherein said membrane electrode assembly is a fuel cell or a battery.

12. A method of producing a membrane electrode assembly, said membrane electrode assembly comprising a membrane sandwiched between two electrodes at least one of which is a gas diffusion electrode, wherein said method comprises the step of casting said membrane electrode assembly in a single pass and at least one phase inversion step.

13. A membrane electrode assembly obtained by the method according to claim 12.

14. The gas diffusion electrode of claim 5, wherein said water repellent layer is obtained by phase inversion of a layer comprising a second binder and hydrophobic particles, wherein said particles of said hydrophobic material are particles of a fluorinated polymer or particles of an electrically non-conductive mineral.

15. The gas diffusion electrode according to claim 14, wherein said water repellent layer further comprises at least one solvent for said second binder.

16. A method of producing a membrane electrode assembly, said membrane electrode assembly comprising a membrane sandwiched between two electrodes at least one of which is a gas diffusion electrode obtained by the method according to claim 1, wherein said method comprises:
   casting said membrane electrode assembly in a single pass and at least one phase inversion step, wherein said gas diffusion electrode has been produced according to the process of claim 1.

* * * * *